United States Patent [19]
Delporte et al.

[11] Patent Number: 5,591,342
[45] Date of Patent: Jan. 7, 1997

[54] PROCESS FOR THE ANAEROBIC DIGESTION OF LIQUID WASTES

[75] Inventors: Claude Delporte, Rueil-Malmaison; Jean-Claude Jacquart, Paris, both of France

[73] Assignee: Degremont, Rueil-Malmaison, France

[21] Appl. No.: 620,755

[22] Filed: Mar. 18, 1996

Related U.S. Application Data

[63] Continuation of Ser. No. 360,067, Dec. 20, 1994.

[30] Foreign Application Priority Data

Dec. 30, 1993 [FR] France ................. 93 15928

[51] Int. Cl.$^6$ .................. C02F 3/28; C02F 1/52
[52] U.S. Cl. ................ 210/603; 210/613; 210/631
[58] Field of Search .................. 210/603, 605, 210/613, 630, 631, 732

[56] References Cited

U.S. PATENT DOCUMENTS

| | | | |
|---|---|---|---|
| 4,597,872 | 7/1986 | Andersson et al. | 210/603 |
| 4,652,374 | 3/1987 | Cohen | 210/603 |
| 4,659,471 | 4/1987 | Molin et al. | 210/603 |
| 4,663,043 | 5/1987 | Molin et al. | 210/603 |
| 4,781,836 | 11/1988 | Thiele et al. | 210/603 |
| 4,981,593 | 1/1991 | Priestley et al. | 210/613 |
| 5,006,639 | 4/1991 | Tono et al. | 210/732 |
| 5,076,927 | 12/1991 | Hunter | 210/603 |
| 5,290,450 | 3/1994 | Kobayashi | 210/603 |

FOREIGN PATENT DOCUMENTS

| 52-5961 | 1/1977 | Japan | 210/603 |
|---|---|---|---|

*Primary Examiner*—Peter A. Hruskoci
*Assistant Examiner*—Theodore M. Green
*Attorney, Agent, or Firm*—Pollock, Vande Sande & Priddy

[57] ABSTRACT

An anaerobic digestion process for the removal of the organic matter contained in a liquid waste, notably raw water, subjects the waste to an acidogenesis stage and then to a methanogenesis stage. The waste, which has been subjected to the acidogenesis stage, is subjected to a stage of separation by settling, before the methanogenesis stage. At least part of the sludge separates during this intermediate stage. Part of the treated water is recycled to the acidogenesis stage.

4 Claims, 1 Drawing Sheet

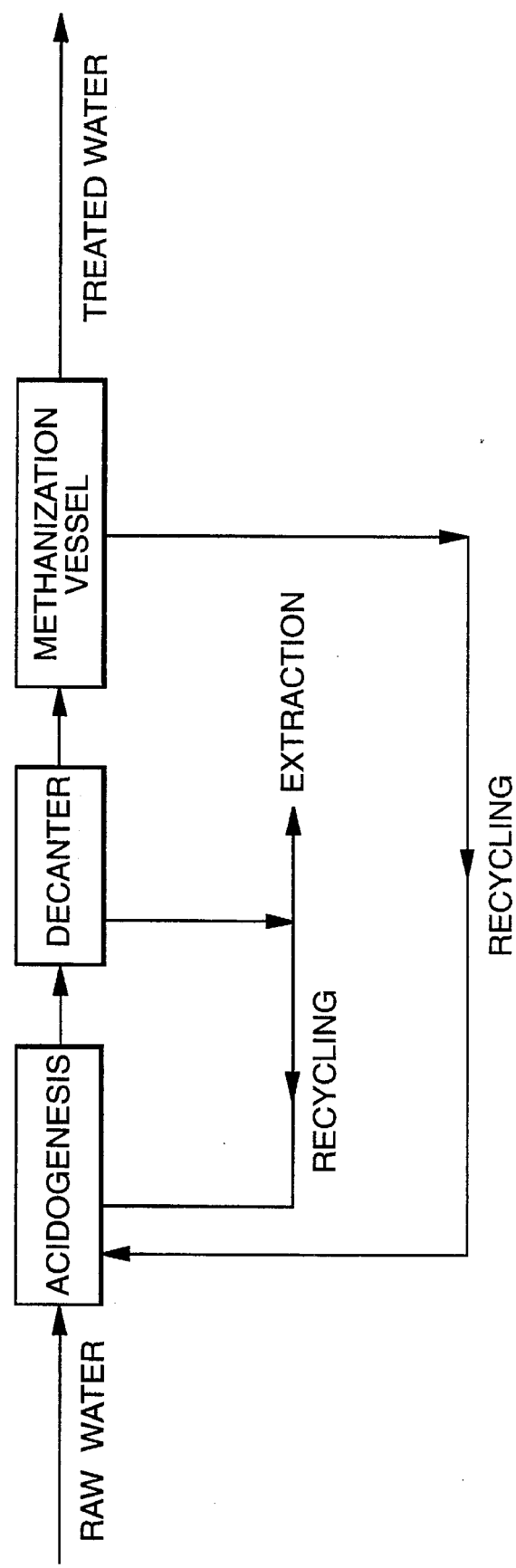

PROCESS FOR THE ANAEROBIC DIGESTION OF LIQUID WASTES

This application is a continuation of U.S. patent application Ser. No. 08/360,067, filed Dec. 20, 1994.

FIELD OF THE INVENTION

The present invention relates to improvements made to the process for the anaerobic digestion of liquid wastes.

BACKGROUND

It is known that in purification plants for liquid wastes, a methanization process is used. The latter takes the form of an anaerobic fermentation carried out by a bacterial population and it includes an acidogenesis stage giving rise to a production of volatile fatty acids, this stage being followed by the methanogenesis stage which produces methane.

BRIEF DESCRIPTION OF THE INVENTION

The present invention proposes to improve such a process by optimizing the acidogenesis stage with a view to increasing the yield of the production of volatile fatty acids and to obtaining better operation of the methanization stage.

Consequently, this invention relates to an anaerobic digestion process for the removal of the organic matter contained in a liquid waste, especially raw water, by subjecting the waste to an acidogenesis stage and then to a methanogenesis stage, This process is characterized in that the waste, which has been subjected to the acidogenesis stage, is subjected to a stage of separation by settling, before the methanogenesis stage. At least part of the sludge separates during this intermediate stage. Part of the treated water is recycled to the acidogenesis stage.

According to the invention, the intermediate stage of separation by settling can include an addition of polymers.

According to a preferred embodiment of the invention, the intermediate stage of separation by settling can be carried out in the acidogenesis reactor.

Other characteristics and advantages of this invention will emerge from the description given below with reference to the appended drawing.

BRIEF DESCRIPTION OF THE FIGURE

The figure is a basic flown diagram of the present process.

DETAILED DESCRIPTION OF THE INVENTION

Examination of the single figure shows that the invention introduces an intermediate stage of separation by settling, with or without polymers, between the acidogenesis and the methanogenesis. The sludge from the acidogenesis stage can thus be recovered and part or all of the separated sludge and part of the treated water can thus be recycled to the acidogenesis, thus making it possible to maintain continuous seeding and a contribution of alkalinity.

The stage of separation by settling can be implemented in a lamellar decanter and it can be integrated with the acidogenesis stage by implementing it in the acidogenesis reactor.

Results obtained by the implementation of the process defined above, in a laboratory pilot unit (volume 10 litres-acidogenesis) and in a semi-industrial pilot plant (acidogenesis: volume 50 litres; methanogenesis: volume 100 litres), have been given below, as a nonlimiting example.

|  | Raw water COD | Acidogenesis Volatile fatty acids % COD | Methanogenesis | |
| --- | --- | --- | --- | --- |
|  |  |  | Applied load Kg COD/$m^3D$ | Efficiency or removal % COD |
| Conventional process | 6.5 g/l | 10 to 25 | 25 to 40 | 75 to 85 |
| Process according to the invention | 6.5 g/l | 30 to 90 | 35 to 90 | 75 to 95 |

Examination of the results thus obtained shows that this process of the invention combines an optimization which makes possible a high production of volatile fatty acids representing 30 to 90% of the soluble pollution, which is reflected by a better operation of the methanization stage on the applied loads and on the quality of the treated water. Another result thereof is a significant reduction in the volumes used, the reduction in the residence time of the waste in the acidogenesis stage making possible a reduction in the volume of the acidogenesis reactor by a factor of 3 to 8.

Of course, it remains that the invention is not limited to the embodiments described and illustrated but that it encompasses all the variants.

We claim:
1. An anaerobic digestion process for the removal of organic matter contained in waste water, comprising the steps:
   subjecting the waste water to an acidogenesis stage;
   subjecting resulting waste water to a sole settling stage of the process;
   the settling stage causing separation of treated water from sludge;
   recycling a portion of the settled sludge, after separation, back to the acidogenesis stage, and enriching the acidogenesis stage with previously treated sediment containing volatile fatty acids;
   subjecting the remaining waste water to a methanogenesis stage;
   recycling water from the methanogenesis stage to the acidogenesis stage, this recycled water being alkaline and contributing alkalinity to the acidogenesis step along with seeding of bacteria, to optimize;
   production of volatile fatty acids during the acidogenesis stage which enables the methanization stage to increase the degree of treatment of the waste water as well as reducing
   (a) the quantity of material needed to neutralize the acidity of the treated water;
   (b) the time the waste need remain resident in the acidogenesis stage.
2. The process set forth in claim 1 wherein polymers are introduced to the waste water during the settling stage.
3. The process set forth in claim 2 wherein the settling stage occurs in an acidogenesis reactor.
4. The process set forth in claim 1 wherein the settling stage occurs in an acidogenesis reactor.

* * * * *